United States Patent [19]

Perego

[11] Patent Number: 4,741,551
[45] Date of Patent: May 3, 1988

[54] FOLDING BABY CARRIAGE
[75] Inventor: Gianluca Perego, Arcore, Italy
[73] Assignee: Peg Perego Pines S.p.A., Italy
[21] Appl. No.: 921,344
[22] Filed: Oct. 20, 1986
[30] Foreign Application Priority Data Apr. 23, 1986 [IT] Italy .............................. 21630/86[U]

[51] Int. Cl.⁴ .............................................. B62B 7/08
[52] U.S. Cl. .................................... 280/642; 280/650;
280/658; 280/47.4
[58] Field of Search ...................... 280/47.4, 642, 644,
280/647, 650, 658

[56] References Cited
U.S. PATENT DOCUMENTS

| 3,459,435 | 8/1969 | Garner | 280/644 |
| 3,689,099 | 9/1972 | Patterson | 280/642 |
| 3,873,117 | 3/1975 | Perego | 280/650 |
| 4,632,421 | 12/1986 | Shamie | 280/658 |

FOREIGN PATENT DOCUMENTS

| 1321085 | 6/1973 | United Kingdom | 280/650 |
| 2006691 | 5/1979 | United Kingdom | 280/647 |

Primary Examiner—David M. Mitchell
Assistant Examiner—Brian L. Johnson
Attorney, Agent, or Firm—McGlew and Tuttle

[57] ABSTRACT

A folding baby carriage composed of an articulated tubular metal framework comprises a pair of folding sides (10) which are interconnected by means of a folding base frame (12) and by means of a steering handle (13) which is slideable with respect to the sides (10), and a seat (14) cum-backrest (15) structure fixed to a pair of frames (16, 17) articulated one to the other at an intermediate point (18) of the frame (16) which in its forward part is pivoted at (29) to the steering handle (13) and in its rear part at (25) to the sides (10) and to the base frame (12). The frame (17) is connected to the sides (10) by linkwork (30) so that the backrest (15) can be moved between an upright position and a reclined position, provision also being made between the sides (10) and the steering handle (13) for disengageable reciprocal engagement means adapted to determine in a stable manner the erected and folded positions of the baby carriage.

4 Claims, 10 Drawing Sheets

FOLDING BABY CARRIAGE

BACKGROUND OF THE INVENTION

The present invention relates to a folding baby carriage constructed from extra-light metal in tubular form, for example aluminium.

SUMMARY OF THE INVENTION

One object of the present invention is to provide a baby carriage which, when not in use, can be folded in a wholly troublefree manner to have very small bulk dimensions so as to be transported and handled without difficulty and stored away within minimal spaces.

Another object of the invention is to embody a baby carriage comprising a rigid footrest with a system of articulation that in no way affects the operations of opening and folding the baby carriage.

A further object of the invention is to embody a baby carriage comprising a backrest that can be moved between an upright position and a reclined position, it being possible to fold the baby carriage whatever the position of the backrest.

To achieve the aforesaid objects, the invention embodies a folding baby carriage consisting of an articulated framework constructed from metal tubing which comprises, in combination: a pair of folding sides interconnected by a base frame, also of the folding type, and through the intermediary of a steering handle slidable with respect to the sides, and a seat-cum-backrest structure fixed to a pair of interarticulated frames at an intermediate point of the seat frame, which in its forward portion is pivoted to the steering handle and in its rear portion to the sides and base frame. The backrest frame is connected to the sides by means of linkwork, so that the backrest can be moved between an upright position and a reclined position, provision also being made between the sides and the steering handle for disengageable reciprocal engagement means adapted to determine the erected and folded positions of the baby carriage in a stable manner.

The baby carriage according to the invention preferably also comprises a rigid footrest which is solid with "U"-shaped member forming part of the aforesaid articulated frame, the "U-shaped being pivoted, at the extremities of its sides proximal to the forward part of the seat frame and adjacent its base, to the respective sides of the articulated framework.

The structural and functional characteristics of the invention, and its advantages, will become more apparent from an examination of the following description, referred to the appended drawings which illustrate an example of baby carriage embodied according to the invention.

BRIEF DESCRIPTION OF THE DRAWINGS

FIGS. from 5 to 8 illustrate the method and stages of folding the baby carriage.

DESCRIPTION OF THE PREFERRED EMBODIMENT

Figure 1:
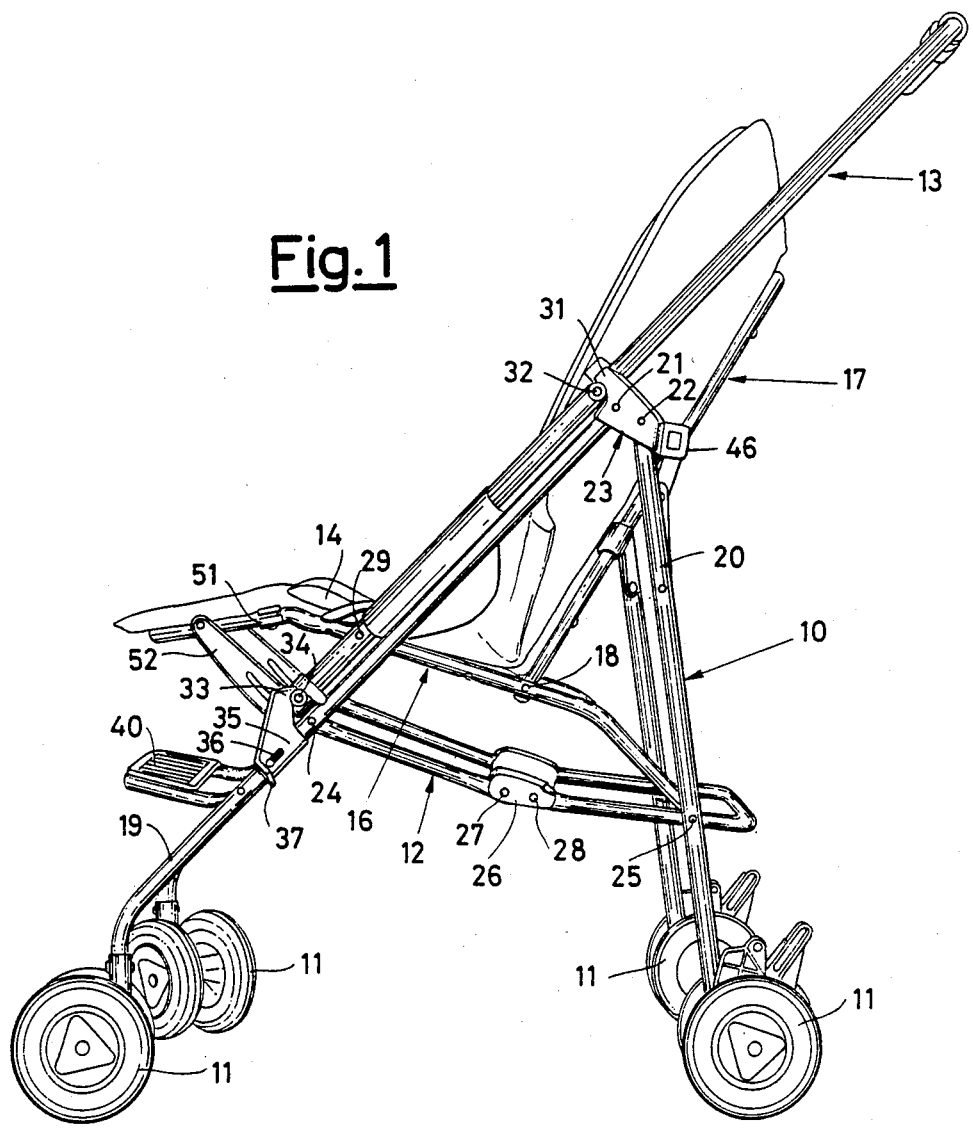
FIGS. 1 and 2 are two views, side and back respectively, illustrating the baby carriage in erected position, with the backrest upright.

With reference to the drawings, the folding baby carriage according to the invention consists structurally of an extra-lightweight articulated framework constructed from aluminium tubing and comprising a pair of sides 10, mounted on pivoting wheels 11, which sides are interconnected by means of a "U"-shaped base frame 12 and a "U" shaped steering handle 13.

The framework carries a seat-cum-backrest structure made of suitable material and fixed to a pair of frames 16, 17 which are articulated one with respect to the other at 18.

More specifically, the first and second side frame members 10 each comprise a pair of rods 19, 20 which carry the wheels 11 at their lower ends, and which are fixed respectively at 21 and pivoted respectively at 22 at their upper ends to a knot or connection member 23 which is slidingly traversed by the relative side of the steering handle 13.

As the Figures clearly show, the base frame 12 is pivoted in its forward part at the points 24 to the rods 19, and in its rear part at the points 25 to the rods 20, and can be folded through the intermediary of a central articulated joint 26 to which there are pivoted at the points 27, 28 the two parts forming the sides of the base frame 12.

As shown in FIG. 1, the seat frame 16 is pivoted in its rear part at the points 25 to the sides 10 and the base frame 12, and in its forward part at points 29 to the sides of the steering handle 13, proximal to their ends.

As well as being pivoted as described above to the frame 16 at the points 18, the backrest frame 17 is connected in an articulated manner to the sides 10 by two pairs of connecting rods 30, 38, which, proximally to the reciprocal pivoting, are also interconnected through the intermediary of a transversal bar 39 for adjusting the position of the backrest.

The baby carriage according to the invention also comprises a rigid footrest 40 fixed solidly to a "U"-shaped member 41 the sides 42 of which are pivoted forwardly at the free ends 43 to the seat frame 16 and at 44, proximally to the footrest 40, to the rods 19 of the sides 10.

The stable erected position of the folding baby carriage embodied according to the invention (FIGS. 1 and 2) is implemented, in its upper part, by the engagement of a pair of hooks 31, solid with the knots 23 provided at the top of the sides 10, with respective pairs of pins 32 emerging from the sides of the steering handle 13, and in its lower part by the engagement of a single hook 33 with a pin 34 emerging radially from the end of one side of the steering handle 13.

Figure 5:
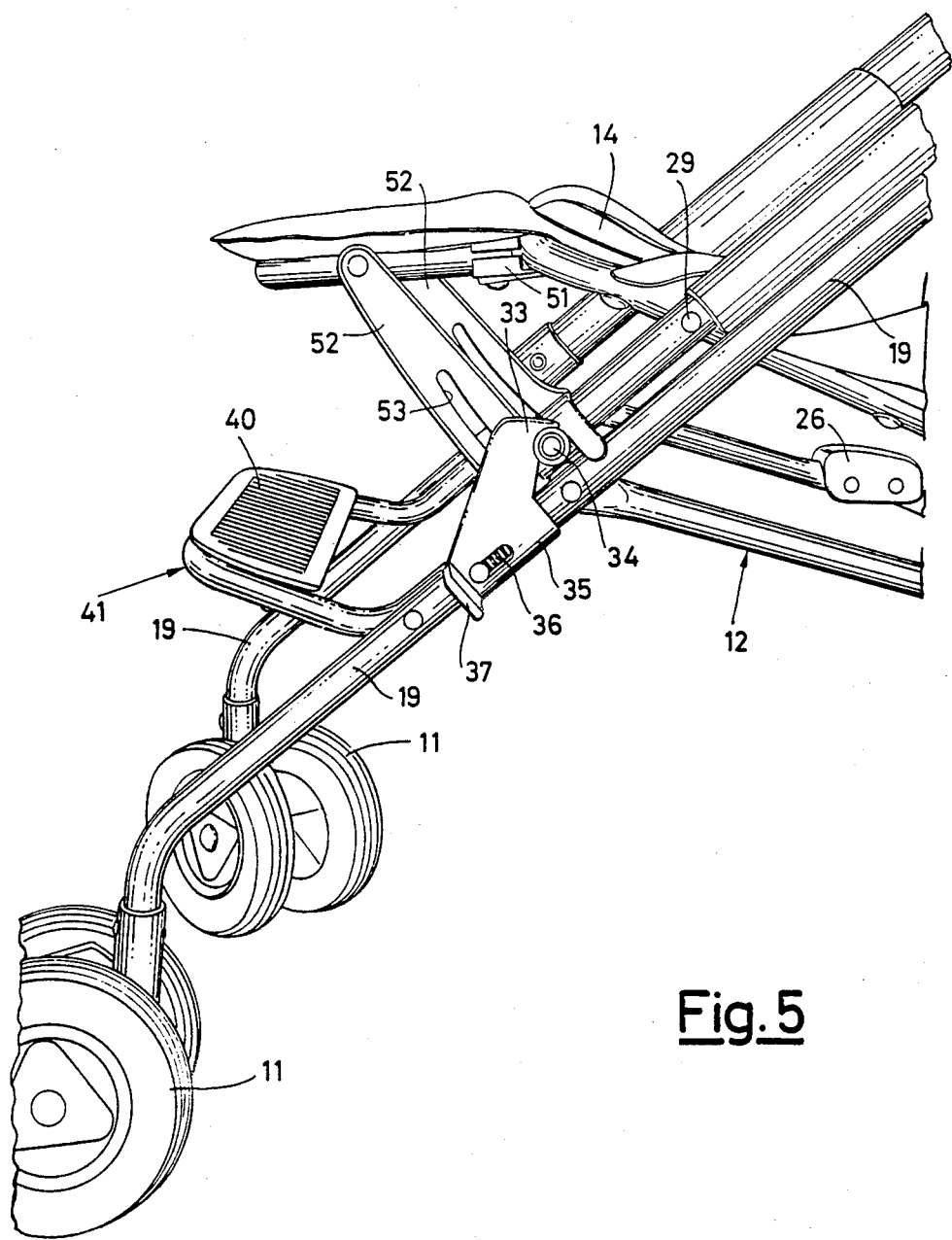

The hook 33 (FIG. 5) is solid with a slider 35 running on the rod 19 against the action of a spring 36 which keeps the hook 33 engaged with the pin 34. An operating flange 37 extends from the slider 35.

Figure 2:
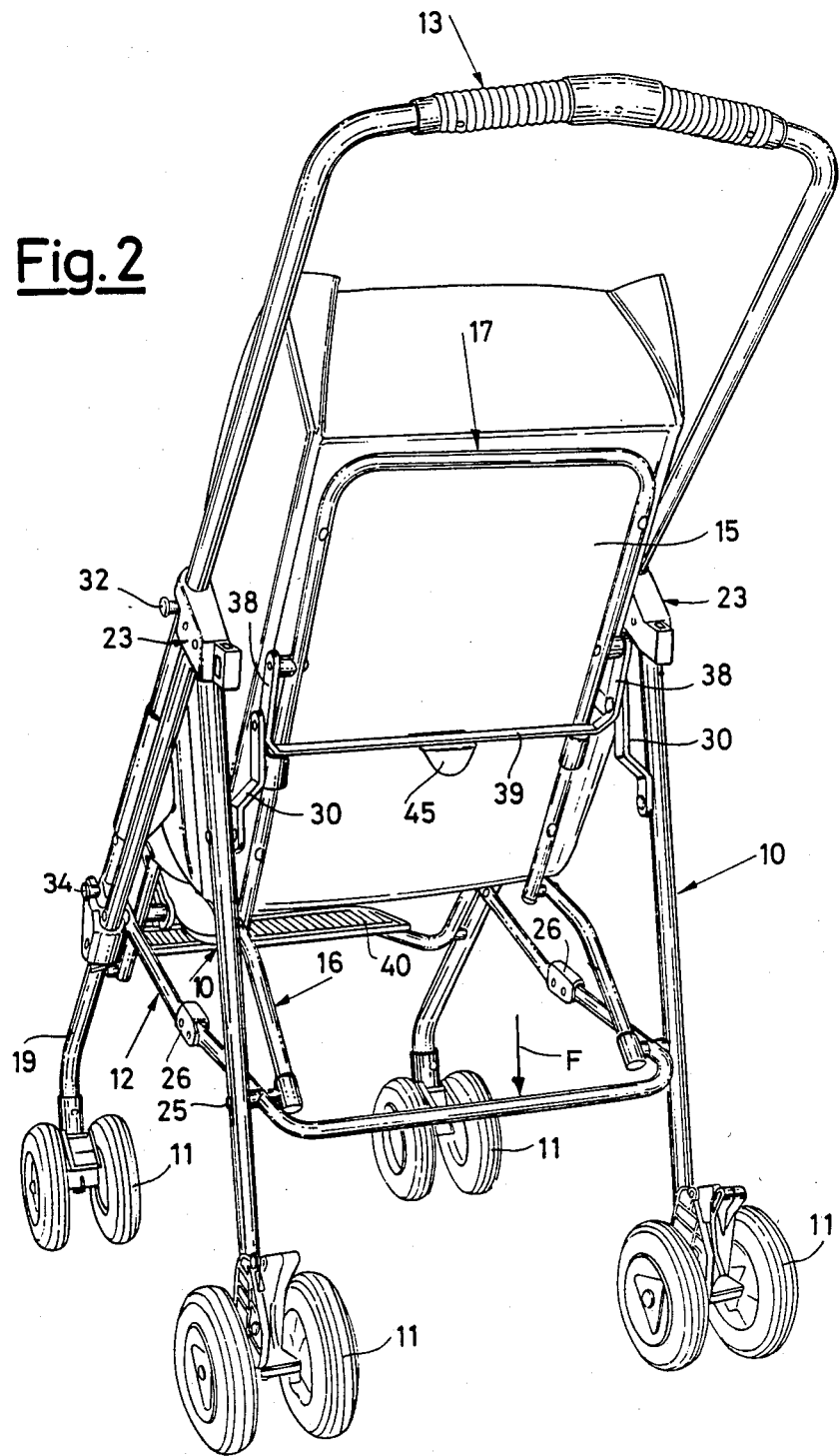
Figure 3:
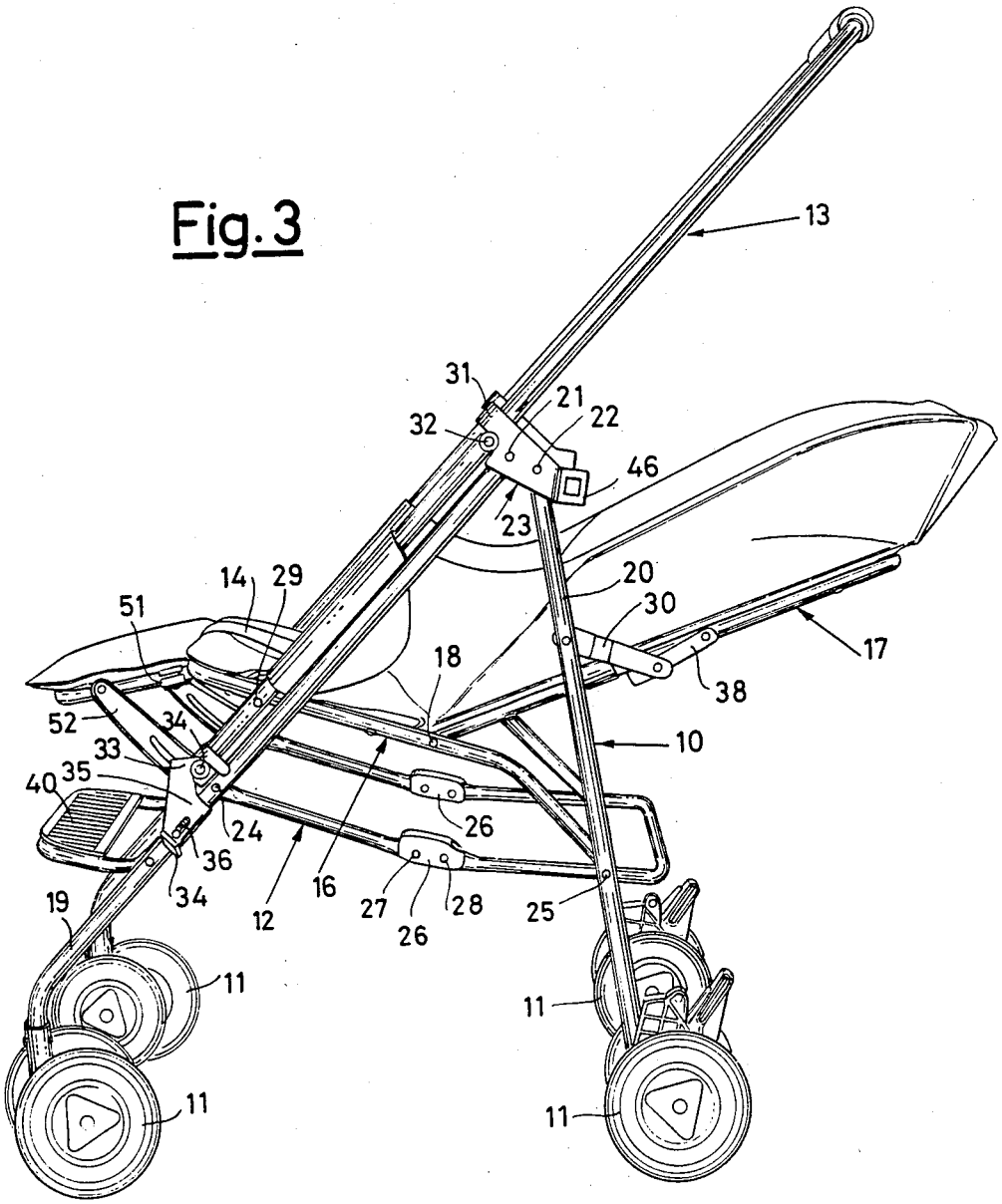
FIGS. 3 and 4 are two views as in FIGS. 1 and 2, but illustrating the baby carriage with the backrest reclined.
Figure 4:
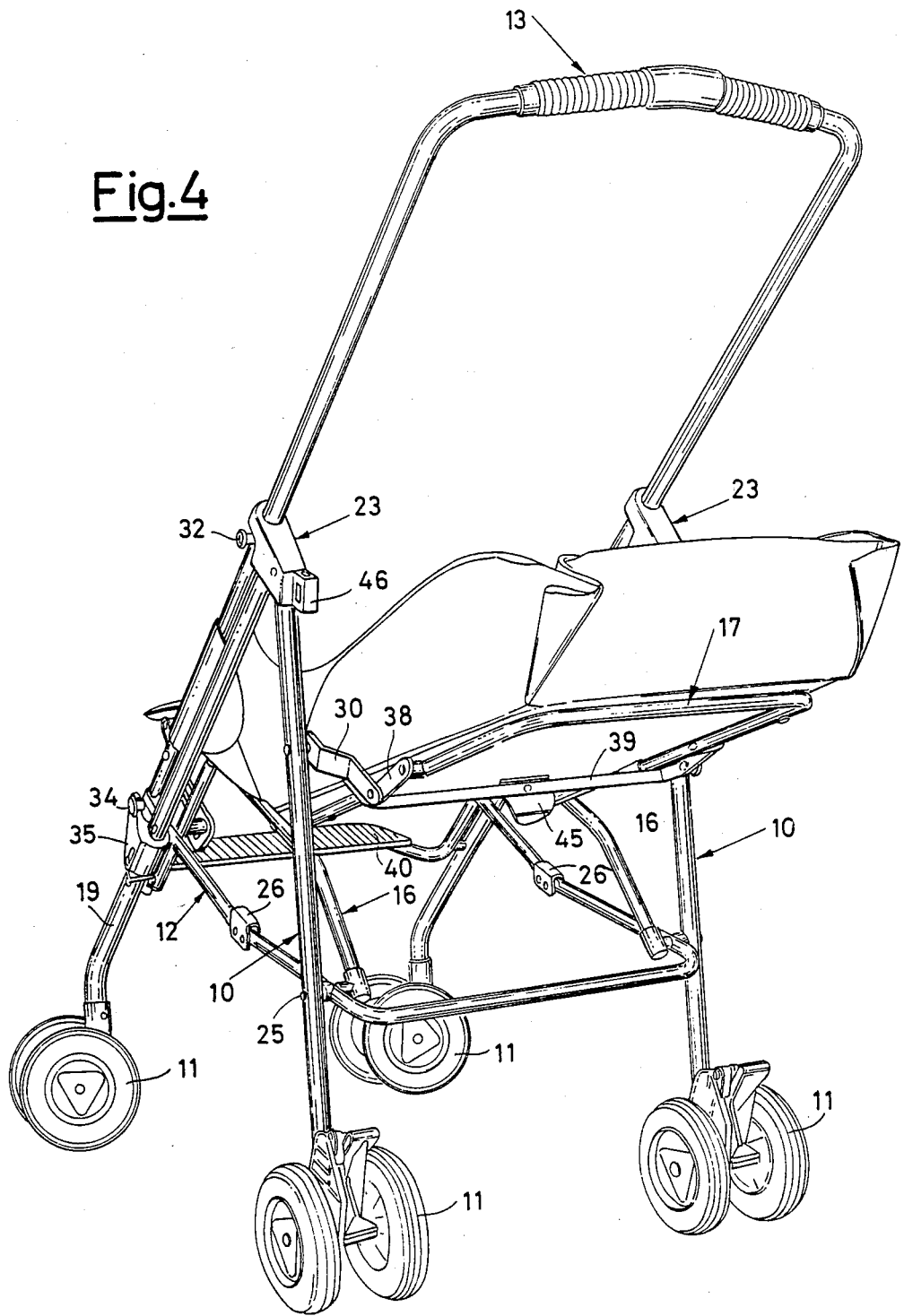

When the baby carriage is in the stable erected position, the backrest 15 can without distinction take up either the upright position shown in FIGS. 1 and 2 or the reclined position shown in FIGS. 3 and 4. These positions are obtained simply by rotating the backrest frame 17 about 18 through the intermediary of the position adjustment bar 39 which to such end is provided with a central grip 45 (FIG. 2). Stable restraint in the two positions is assured by the pair of connecting rods 30, 38, which when the backrest is in the upright position overcome top dead center.

Figure 6:
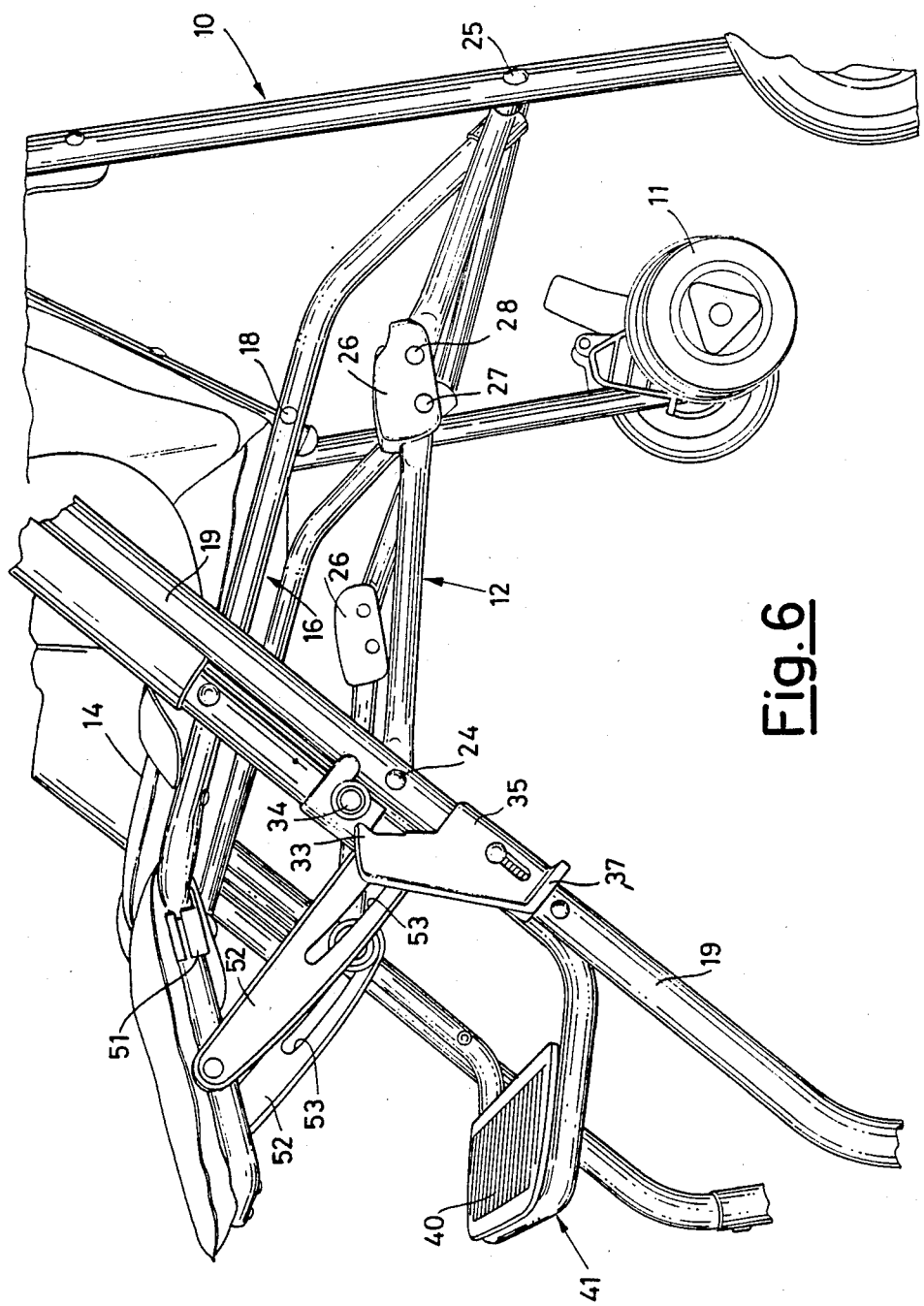
Figure 7:
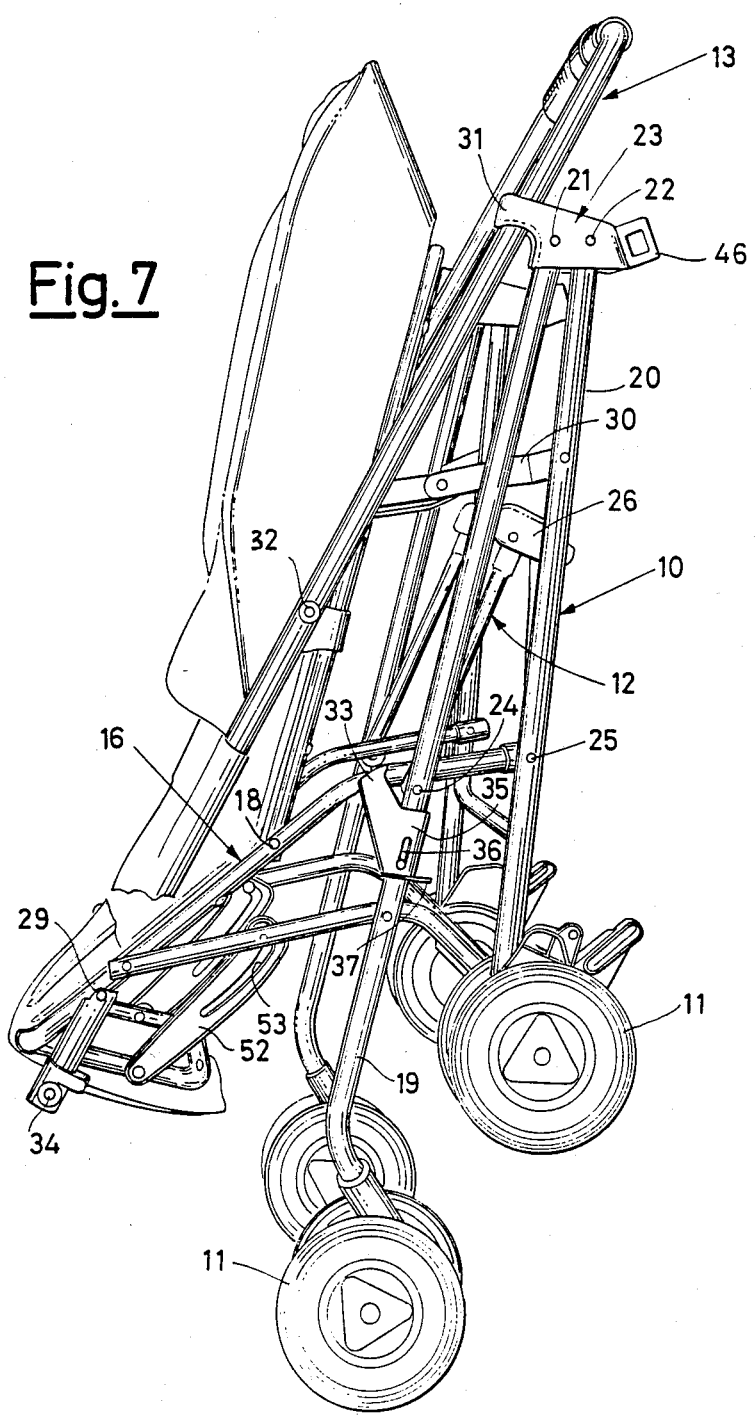
Figure 8:
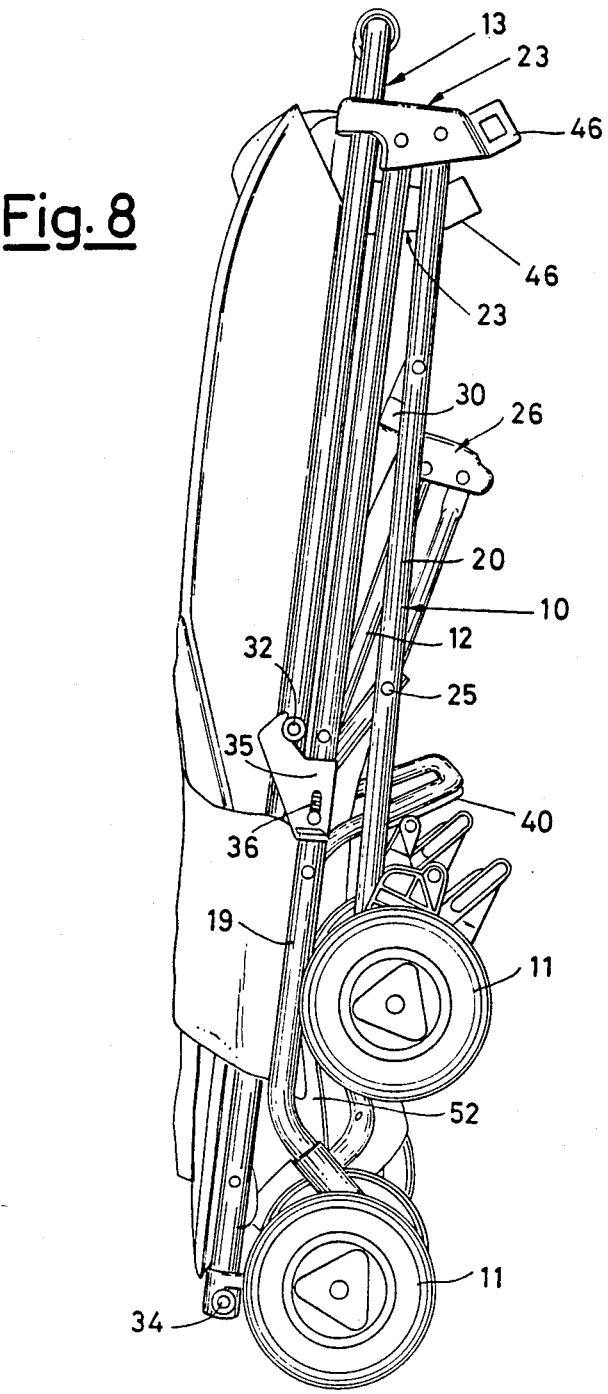

The baby carriage can be folded in the stable position shown in FIG. 8 by first lowering the operating flange 37 (for example with a hand) so as to cause the translation of the slider 35 into the position of FIG. 6, where the hook 33 is disengaged from the pin 34, and then by pressing down (for example with a foot), in the direction of the arrow F of FIG. 2, on the rear side of the base frame 12, so as to cause it to fold and thus also causing the sides 10 to fold; the baby carriage folding operation is concluded by pushing the steering hangle 13 downwards until one of the pins 32 engages the hook 33 (FIG. 8).

In the folded position shown in FIG. 8, the baby carriage according to the invention has minimal bulk and so can be transported without fatigue, by means of the steering handle 13 and, when not in use, is sufficiently compact to be stored without difficulty.

It should be noted that the special mounting system employed for the rigid footrest 40 not only cooperates with the reciprocal connection between the sides 10 but ensures that the presence of the footrest 40 in no way interferes with the baby carriage erecting and folding operations, since it turns over forwards and backwards in a manner automatically entrained by the rest of the framework.

Of note, lastly, is the fact that the particular mounting arrangement of the seat 14-cum-backrest 15 structure permits the baby carriage of the invention to be folded without distinction whether the backrest is in the erect or reclined position.

Figure 9:
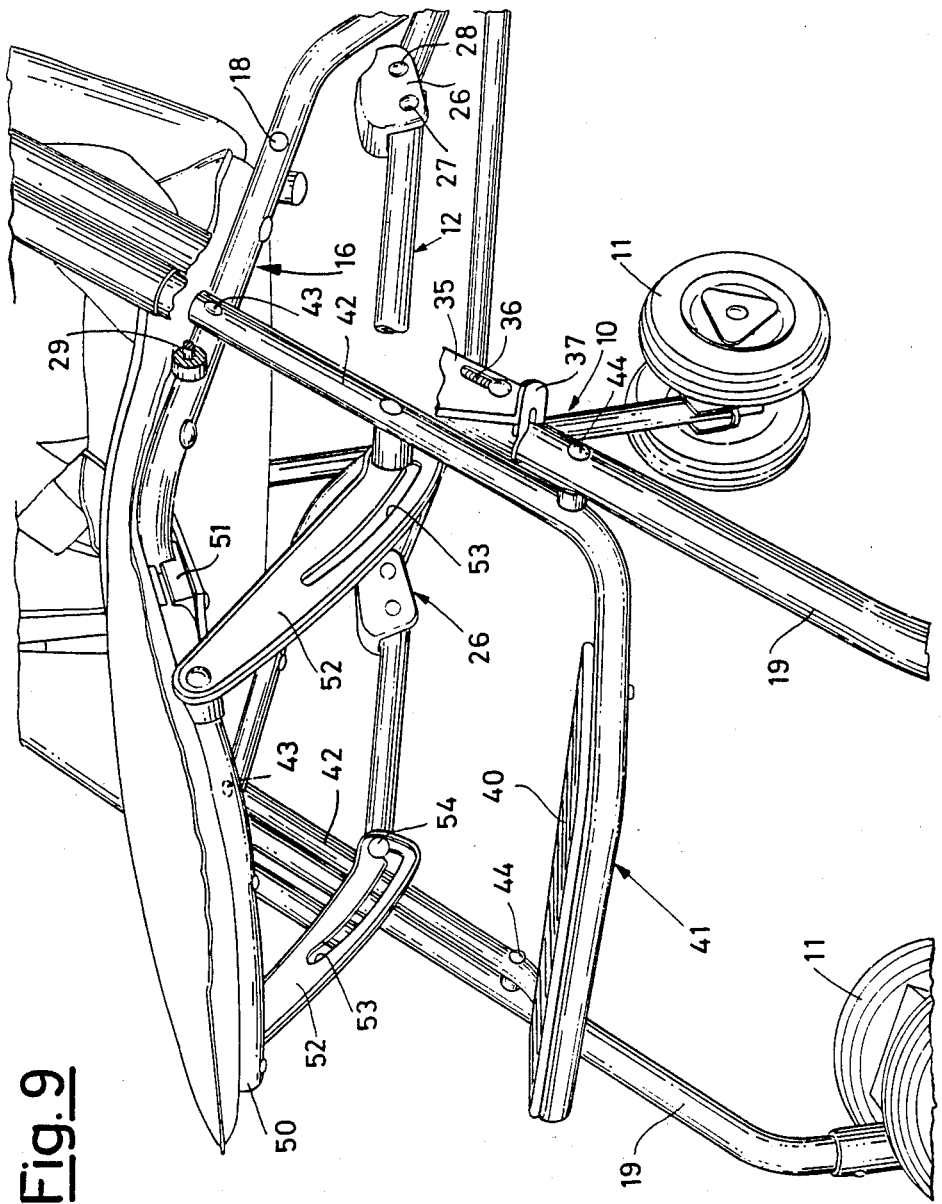
FIGS. 9, 10 and 11 are details.

As can be seen clearly from FIG. 9 of the drawings, the baby carriage seat can be extended by means of a portion 50 which is rotatable about a hinge 51 and carried by a pair of lateral articulated arms 52 provided with shaped slots 53 sliding on pins 54 emerging from the sides 42. The portion 50 can in this way be raised and lowered as wished, without in any way interfering with the movements of erection and folding of the baby carriage.

Figure 10:
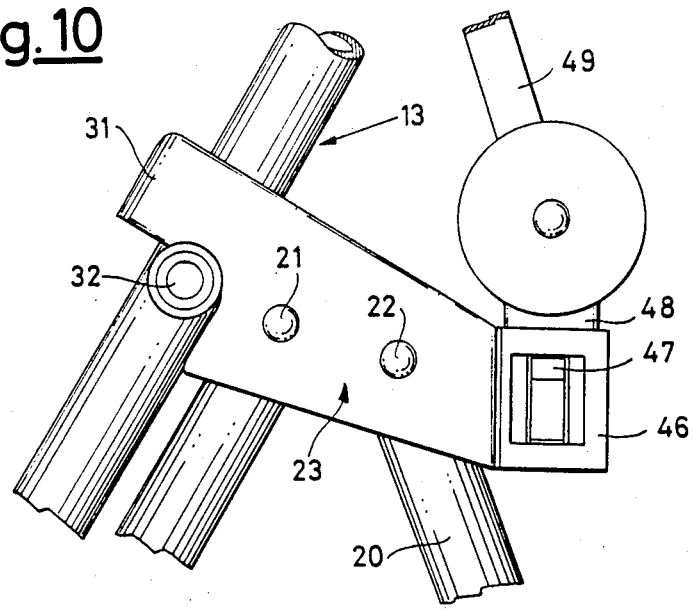
Figure 11:
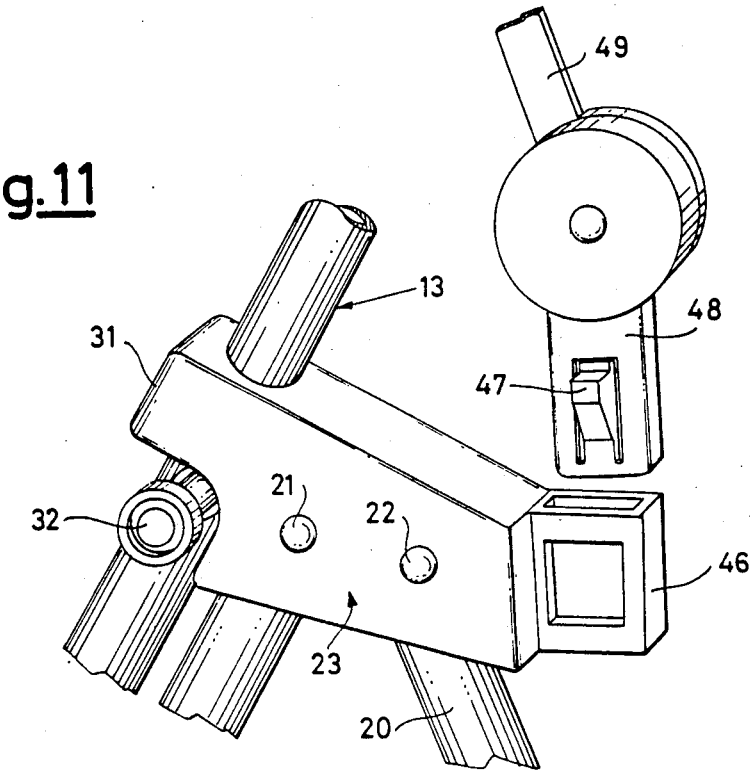

FIGS. 10 and 11 of the drawings provide detailed illustration of the knots 23 of the sides 10 of the framework, which also advantageously comprise box-shaped seatings 46, into which a coupling 48 of a frame 49 carrying a traditional parasol (not shown) can be inserted in disengageable snap-fit manner by means of an elastic tang 47.

I claim:

1. A foldable baby carriage formed of an articulated tubular metal framework and being adjustable into a stable operative position and a stable folded position, comprising: first and second connection members; right and left side frame members each side frame member having first and second rods, each first rod and each second rod connected at an upper end to a pivot associated with one of said first and second connection members; a U-shaped base frame positioned between and connecting with each of said first rods, said U-shaped base frame having a first foldable leg member having a central articulated joint and second foldable leg member having a central articulated joint, each of said first and second foldable leg members being pivotally connected to one of said second rods; a U-shaped steering handle member having a first steering handle leg member and a second steering handle leg member, each handle leg member being slidably connected to an upper portion of said side frame members through a slide opening in respective first and second connection members; a seat and backrest assembly including a backrest structure fixed to first and second seat frame members and fixed to a backrest frame, said backrest frame being articulated to an intermediate point in each of said first and second seat frame members, each of said first and second seat frame members being pivotally connected at a forward part to a lower portion of respective first and second steering handle leg members and each of said first and second seat frame members being pivotally connected at a rear part to respective said first rods of said side frame members, and backrest frame being connected to respective said side frame members by link work assemblies so that the backrest may be moved between an upright and a reclined position; and, engagable reciprocal engagement means for fixing the position of the slidable U-shaped steering handle member relative to the side frame members for maintaining the carriage in a stable operative position and for releasing the U-shaped steering handle member relative to the side frame members for adjustment of the carriage into a fixed stable folded position.

2. A folding baby carriage according to claim 1, wherein: the engagement means includes hooks associated with the upper end of said side frame members; first and second pins associated with an upper portion of respective first and second steering handle leg members; a lower pin associated with a lower end of one of said first and second steering handle leg members; and, lower slidable hook means connected to a lower portion of one of said right and left side frame members for sliding, against the action of a spring, with respect to one of said side frame members for engagement with said lower pin when the carriage is in an operative position and for engaging one of said first and second pins when the carriage is in a folded position.

3. A foldable baby carriage according to claim 1, further comprising: a rigid foot rest fixed to a footrest U-shaped member, the foot rest U-shaped member having first and second foot rest U-shaped member legs, each foot rest U-shaped member leg being pivoted, at foot rest U-shaped leg ends, proximal to the forward part of the seat frame and adjacent respective said first and second seat frame members, to respective said second rods of said side frame members.

4. A foldable baby carriage according to claim 1, wherein: said first and second connection members include box-shaped seatings for receiving a coupling member with a support frame, the coupling member having a shaped elastic tang which is insertable in the box-shaped seatings so as to connect said support frame to said side frame members through one of said first and second connection members.

* * * * *